(No Model.)

J. B. GATHRIGHT.
CHECK HOOK FOR HARNESS SADDLES.

No. 300,357. Patented June 17, 1884.

UNITED STATES PATENT OFFICE.

JOSIAH B. GATHRIGHT, OF LOUISVILLE, KENTUCKY.

CHECK-HOOK FOR HARNESS-SADDLES.

SPECIFICATION forming part of Letters Patent No. 300,357, dated June 17, 1884.

Application filed April 28, 1883. (No model.)

*To all whom it may concern:*

Be it known that I, JOSIAH B. GATHRIGHT, a citizen of the United States, residing at Louisville, in the county of Jefferson and State of Kentucky, have invented certain new and useful Improvements in Check-Hooks for Harness-Saddles; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object of my invention is to provide a better method of securing check-hooks to gig-saddles, and to so construct and arrange all parts that no projection is left beneath the tree to hurt the withers of the horse.

Figure 2:
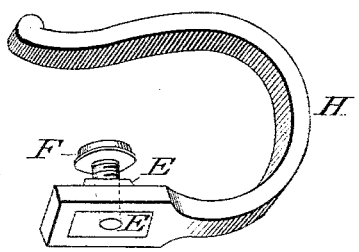
Figure 1:
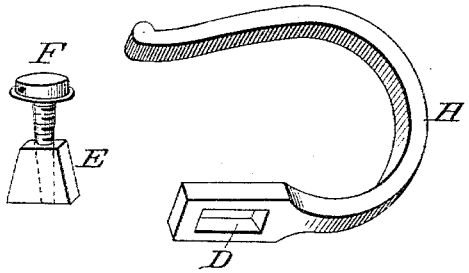

In the drawings, Figure 1 shows the different parts constructed according to my invention. Fig. 2 shows the parts together, it being understood, of course, that the head or gullet of the gig-tree is to be clamped between the hook and the head of screw F.

It is seen in Fig. 2 that the check-hook H is provided with a tapering hole, D, largest at the bottom, and that a tapering nut, E, is provided of proper form and size to fit up into hole D, until the base of the nut and the lower surface of the hook are practically flush, so as to avoid a lump that might hurt the horse. The nut E is made sufficiently long, preferably to extend up into the square bolt-hole of the tree, so as to more effectually prevent the hook from turning. A screw, F, similar to a "pad-screw" is provided, and adapted to pass down through the bolt-hole of the tree and into nut E, securely clamping all parts together. In order that the head of the screw F may conform to the inclined top surface of the tree, the nut E is tapped slightly oblique, (or the sides may be unequally beveled,) thus allowing the screw to have a slanting direction, when its head will finish properly with the top of the tree.

What I claim as new is as follows:

1. In combination with a check-hook, H, provided with a suitable hole, D, a tapering or headed nut, E, adapted to project into the hole from below until practically flush with the under surface of the shank of the hook, and up into the bolt-hole of the tree, and a screw, F, adapted to enter said bolt-hole and nut from above, substantially as set forth.

2. In a fastening for check-hooks, the combination of the screw F and the tapering or headed nut E, said nut being adapted to penetrate through the check-hook and up into the bolt-hole of the tree, and tapped obliquely, as and for the purpose set forth.

In testimony whereof I affix my signature in presence of two witnesses.

JOSIAH B. GATHRIGHT.

Witnesses:
 JOHN J. HARBISON,
 T. R. WRIGHT.